Sept. 12, 1950 C. G. MAHRING 2,522,129
SAFETY DEVICE FOR MOTOR VEHICLES
Filed Dec. 13, 1946 2 Sheets-Sheet 1

Inventor
CHARLES G. MAHRING

By W. S. McDowell
Attorney

Sept. 12, 1950      C. G. MAHRING      2,522,129
SAFETY DEVICE FOR MOTOR VEHICLES
Filed Dec. 13, 1946      2 Sheets-Sheet 2
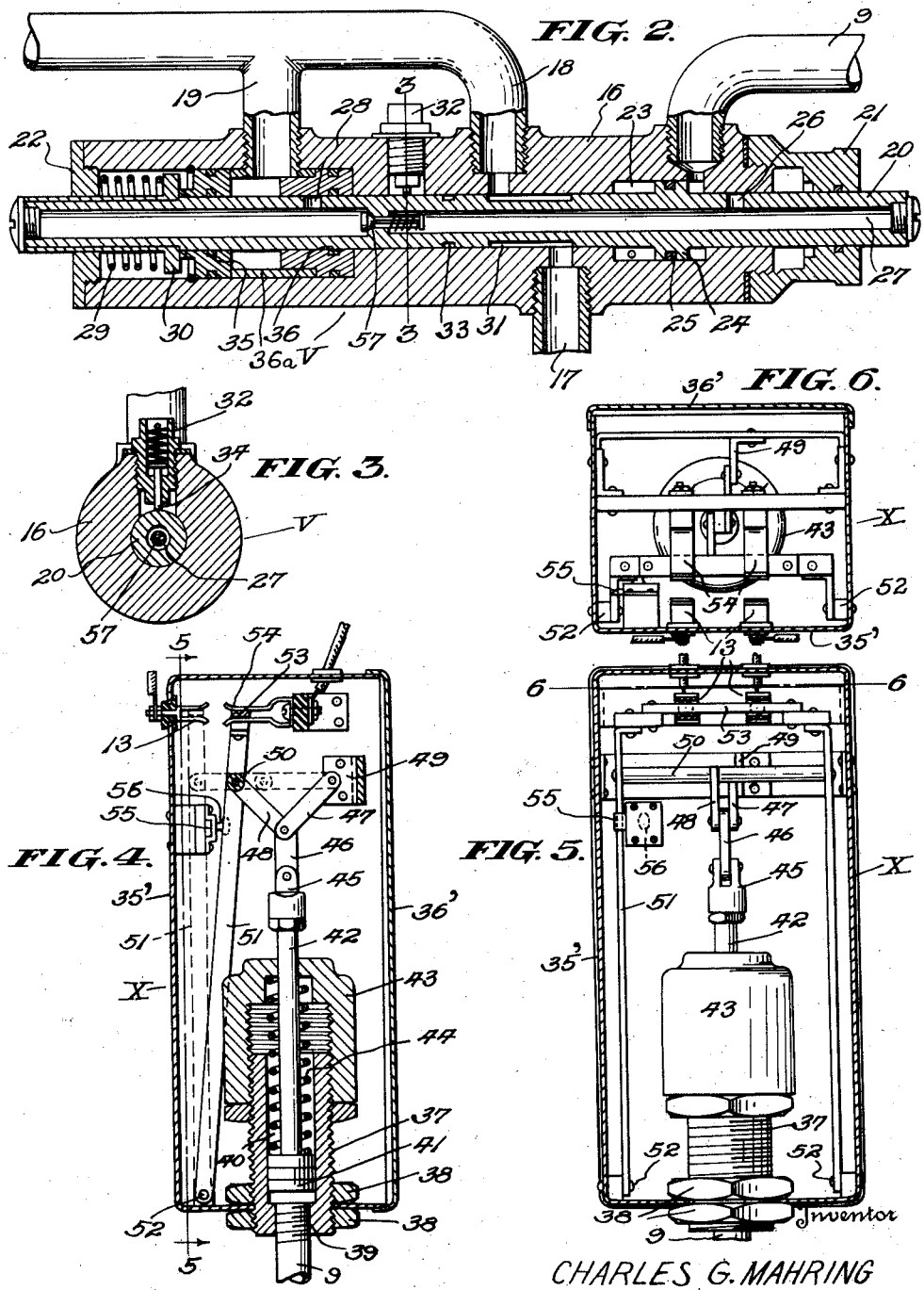
CHARLES G. MAHRING
By W. S. McDowell
Attorney Patented Sept. 12, 1950

2,522,129

UNITED STATES PATENT OFFICE 2,522,129

SAFETY DEVICE FOR MOTOR VEHICLES

Charles G. Mahring, Black Lick, Ohio

Application December 13, 1946, Serial No. 716,066

6 Claims. (Cl. 180—83)

This invention deals with motor vehicles, and more specifically with motor vehicle safety devices of the type adapted to render an associated vehicle inoperative upon collision or impact with another object.

At present, the number of "hit-and-run" accidents which occur throughout the country have reached enormous proportions, and considerable time is being expended, particularly by law enforcement officials, in an effort to curtail and stamp out all such incidents of this character. Many people, absolutely void of any criminal propensities, will leave the scene of an accident after collision, due to the effect of the ensuing shock or possible injury caused thereby, and in so doing, subject themselves to later criminal prosecution. In addition to these persons, there are a great number of people who have a tendency to try to avoid liability or blame, and immediately after a collision, with the thought of escape, will drive their vehicles, if possible, away from the scene of the accident.

Accordingly, it is the foremost object of the present invention to provide a safety device for automotive vehicles which incorporates means, responsive to the impact force of a collision, for automatically locking the brakes of the vehicle and simultaneously opening the ignition circuit thereof to bring the same to rest in the shortest possible distance; thereby rendering further operation of the vehicle impossible until various relatively inaccessible mechanisms are re-set to release the brakes and close the ignition circuit of the vehicle.

It is another object of this invention to provide a safety device of this character which may be conveniently installed upon the present day automobile without structural modification of the latter.

A further object of this invention is to provide a safety device of this character which serves both as a means for stopping an automobile after collision, and as a means for preventing theft thereof by a person unaware of the installation of the device upon the vehicle.

It is yet another object of the present invention to provide a safety device of the character described which incorporates means for signalling the occurrence of an accident or collision after the same has taken place.

These and other additional objects and advantages of the present invention will become readily apparent with reference to the following description and accompanying drawings wherein:

Fig. 2 is a detailed longitudinal vertical sectional view taken through the hydraulic brake control valve incorporated in the present safety device system;

Fig. 3 is a vertical sectional view taken along the line 3—3 of Fig. 2 and disclosing the locking device associated with the brake control valve;

Fig. 4 is a vertical sectional view taken through the hydraulically controlled ignition circuit-breaking switch incorporated in the present safety device system;

Fig. 5 is a vertical sectional view taken along a plane indicated by the line 5—5 of Fig. 4;

Fig. 6 is a horizontal sectional view taken along the line 6—6 of Fig. 5.

Figure 1:
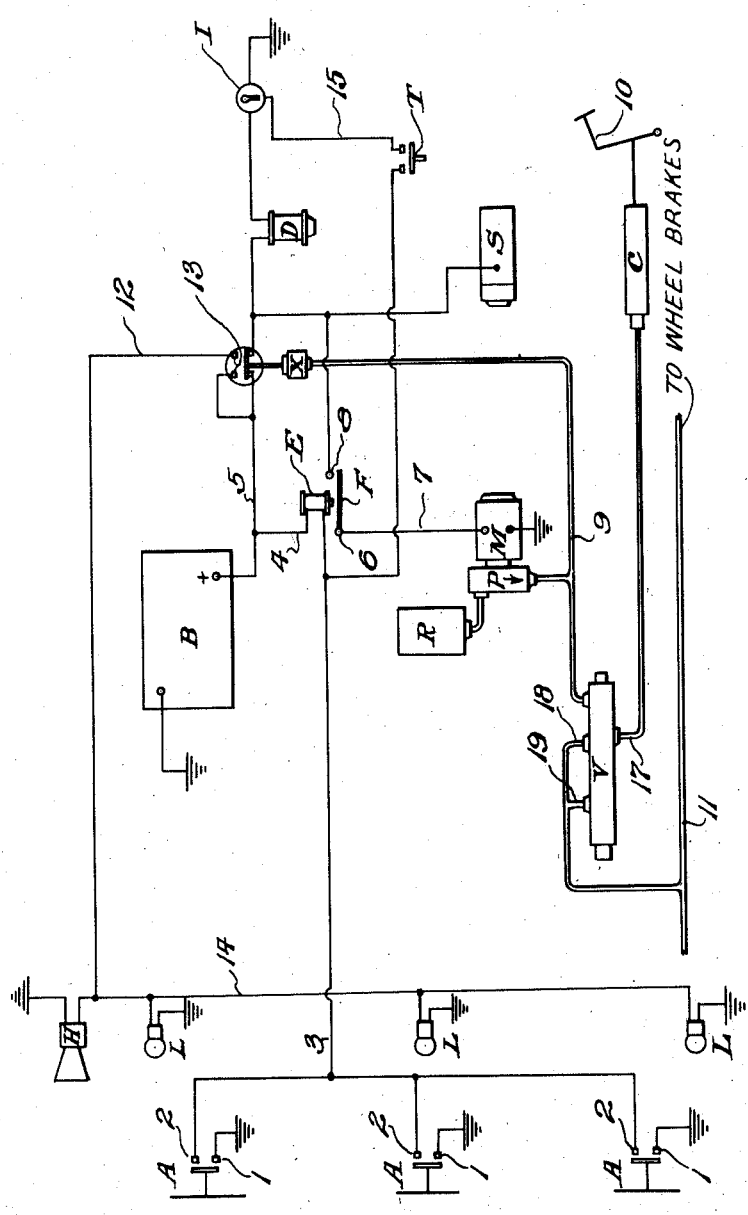
Fig. 1 is a diagrammatic view of the present safety device for motor vehicles, disclosing the relation between the incorporated electrical circuits and the hydraulic mechanism ambient thereto.

Referring now to Fig. 1 of the drawings, it will be noted that the present safety device makes use of a plurality of electrical switches, denoted by the letter A, of any suitable type capable of closure by forces created from a direct impact such as would be caused by a collision of an automobile with a pedestrian, another automobile, or any relatively stationary object. These switches may be positioned at a number of suitable points throughout an automobile, such as immediately behind the front fenders within the radiator grille, or behind the front bumper thereof. It will be understood that these switches should be positioned so as to be responsive only to relatively large impact forces such as would normally bend or dent a fender, or radiator grille, and should not be positioned so as to respond to the normally light bumper impacts received in traffic or in ordinary driving.

One pole of each of these switches is grounded directly to the body of the associated vehicle, as at 1, while the opposite poles 2 are connected in parallel with a single electrical lead 3 joined with one pole of an electromagnet E. The opposite pole of the electromagnet is electrically connected with the positive pole of an automobile storage battery B by a lead wire 4 united with a positively charged manifold conduit 5, so as to complete an energizing circuit to the electromagnet upon closure of any one of the impact switches A. Acting in response to the attractive forces produced by the electromagnet E, is a swinging armature F pivotally mounted at a point 6 and electrically connected by means of a lead wire 7 to a suitably grounded electric motor M. This armature is normally carried out of registration with the electromagnet E by suitable spring means, not shown, which means is overcome by the magnetic field of the electromagnet upon energization thereof, to permit the armature to engage with a positively charged contact point 8 electrically joined with the manifold conduit 5, to close an electrical circuit to the motor M.

Driven by the motor M is a fluid displacement pump P which serves to supply fluid under pressure from a reservoir R to a fluid conduit 9 which is connected at its respective ends with a brake control valve V and a hydraulically controlled circuit-breaker switch X.

The brake control valve V, which will hereinafter be described more in detail, acts in response to pressure created by the pump P to close off the normal hydraulic brake system of the associated automobile and to supply hydraulic pressure to the individual brake drums independently thereof, in order that the brakes of the automobile may be locked upon actuation of the pump. As diagrammatically illustrated in Fig. 1, the normal brake system of the associated vehicle is represented by the master hydraulic cylinder C which is controlled by a foot pedal indicated by the numeral 10, which cylinder supplies fluid in a normal manner to the individual brake drums through the fluid conduit 11.

The hydraulically controlled circuit-breaking switch X, positioned at the opposite end of the fluid conduit 9, acts in response to pressure created by the pump to break or open the ignition circuit of the automobile. This switch is positioned along the manifold conduit 5 between the battery B and an ignition coil D. The switch X occupies a position of circuit closure from the positive pole of the battery through the ignition coil D and through the normally grounded ignition switch I of the automobile. As hydraulic pressure reaches the switch X from the pump P, the ignition circuit will be broken and a signal circuit 12 will be closed. The latter circuit consists of a pair of contact points 13 in registration with the switch X, and disposed between the positive pole of the battery and a trunk line 14 to which is connected in parallel a number of suitably grounded signal lamps L and an electrical sounding horn H.

An anti-theft control is provided within this system and consists of a circuit 15 leading from the ignition switch I to the electrical lead 3 joined with the negative pole of the electromagnet E. A manually controlled switch T is disposed within this circuit, and upon closure of the ignition switch I, serves to ground the electromagnet E to energize the same independently of the impact switches A. With the switch T in an open position, the anti-theft circuit is broken, and allows the automobile to function in its normal manner.

Referring to Fig. 2 of the drawing, which is a detailed vertical sectional view taken through the brake controlling valve, it will be noted that the same comprises an outer casing 16 formed at various positions with threaded openings adapted for the reception of the inlet fluid conduit 9, the inlet and outlet conduits 17 and 18 respectively of the standard hydraulic brake system of the automobile and a fluid outlet conduit 19 associated with the present safety device and with the main brake conduit 11.

The outer casing of the valve is formed with an axially disposed bore which receives a longitudinally slidable tubular shaft 20. The outer ends of the casing 16 are provided with threaded end caps 21 and 22 respectively which serve to maintain the shaft in substantially axial alignment with the bore thereof. The bore of the shaft is enlarged substantially in registration with the incoming fluid conduit 9 to provide a circular cylinder or chamber 23. The shaft 20, at this point, is formed with a circular piston collar 24 whose outer surface is provided with an annular packing ring 25 which maintains wiping engagement with the walls of the chamber 23. As fluid under pressure is introduced to the valve through the conduit 9, the same will react against the circular piston collar 24 to cause the tubular shaft 20 to slide forwardly of the casing and bring into registration with the chamber a radially positioned opening 26 formed within the shaft and communicating with the hollow bore 27 thereof. This forward sliding movement of the shaft 20 permits fluid from the conduit 9 to pass inwardly of the shaft and enter the bore thereof. The shaft is further formed with a second radially disposed opening 28 which, upon forward sliding movement, is brought into registration with the outlet conduit 19 of the valve. In this manner, fluid under pressure of the pump P will be caused to flow through the conduit 9, through the bore of the shaft, and into the outlet conduit 19 which is joined with the main brake conduit 11 where pressure is exerted upon the individual brake drums of the automobile.

The normal position of the shaft 20, within the valve casing 16, is its rearmost position as illustrated in Fig. 2, wherein conduit 9 is in direct communication with chamber 23, the shaft being maintained in this position by the action of an expansion spring 29 interposed between the inner face of the end cap 22 and a retention collar 30 formed at the periphery of the forward end of the shaft, the extent of the rearward movement of said collar being limited by abutting engagement with a packing ring 35. In its normal position, the valve allows the brake system of the automobile to function in its normal manner by allowing fluid from the master cylinder C to pass inwardly of the valve through the inlet conduit 17 whose opening registers with an annular groove 31 formed in the shaft, which groove extends and communicates with the opening of the outlet conduit 18. As the shaft slides forwardly in response to the pressure created by the pump P, the groove 31 formed in the shaft will also slide forwardly to close the opening of the master cylinder conduit 17 and thereby close off the normal operation of the brake system to allow the safety system to function independently thereof.

A manually adjustable spring-loaded catch 32 is introduced to the periphery of the sliding shaft through a threaded opening formed in the outer casing 16. The shaft is provided with a second annular groove 33 forward of the groove 31, and as the shaft slides forwardly, a stud 34 formed at the end of the catch 32 drops downwardly to engage with the groove 33 and thus lock the shaft in its foremost position. It will be understood that it will be necessary to manually release the catch 32 before the shaft may be returned to its normal rearmost position to permit operation of the pedal controlled brake system. The inner bore of the casing 16 may be conveniently enlarged at suitable positions to provide for the placement of annular packing rings 35 and 36 which serve to maintain a fluid-tight connection between the walls of the casing and the outer wall of the slidable shaft, and which are held in position by an annular spacer sleeve 36a.

The circuit-breaker switch X comprises a substantially rectangular box-like casing 35' provided with a removable face plate 36'. The lower wall of this casing supports a longitudinally disposed tubular cylinder 37, whose outer surface is threaded and receives at its lower end a pair of annular retention nuts 38, which serve to firmly fasten the cylinder to the bottom wall of the casing. The cylinder is further provided at its lower end with a threaded opening 39 which receives the cooperatively threaded upper end of the fluid conduit 9. Communicating with this opening, is the relatively enlarged tubular bore 40 of the cylinder which receives a longitudinally slidable piston 41. The latter carries a longitudinally extending rod 42 which is slidably carried within an opening formed in the top of headcap 43 which is held in threaded engagement with the upper portion of the cylinder. Positioned between the piston and the cap 43, is a coil spring 44 which serves to normally carry the piston in its lowermost position, as shown in Fig. 4. Carried at the upper outer end of the rod 42 is a bifurcated link 45 which pivotally receives one end of a thrust arm 46. The latter is pivotally joined at its opposite end with the inner ends of a pair of outwardly projecting spreader arms 47 and 48, respectively. The outer end of the arm 47 is pivotally held by a bracket 49 carried transversely of the casing 35', while the outer end of the arm 48 is pivotally secured to a rod 50 carried transversely of a substantially U-shaped switch bracket 51. The bracket 51 is pivotally anchored at its lower ends, as at 52, and is subjected to limited rocking movement by the longitudinal movement of the rod 42 acting in response to fluid pressure introduced through the conduit 9. The upper end of the bracket 51 carries a copper crossbar 53 which is receivable within a pair of spaced transversely disposed contact terminal clips 54 coupled with the ignition circuit of the vehicle between the battery B and the ignition coil D. This crossbar occupies a position of circuit closure with the clips 54 when the piston 41 and the rod 42 are in their lowermost positions. As fluid is introduced to the cylinder through the conduit 9, the piston and rod are forced upwardly, and through the pivotal linkage of the associated arms, the bracket 51 and crossbar are swung out of contact with the clips 54 and into engagement with a similar pair of terminal clips 13, which serve to close the signal circuit 12 of the safety device.

The switch X is further provided with a locking device for holding the bracket 51 out of engagement with the ignition terminals 54 and into engagement with the signal terminals 13. This device consists of a sliding wedge 55 held under spring tension in its outward position in the path of one of the longitudinal arms of the bracket 51. The wedge allows the bracket to swing past it as the piston 41 rises, but once the bracket is past the wedge, the same will firmly lock the bracket in the signal closure position. The operation of this device is analogous to the action of a door catch, and a manually controlled knob 56 must be turned to release the wedge and reset the bracket for normal vehicle operation.

In operation, the present safety device system centers about the electromagnetic relay switch E which is controlled by the impact switches A, and by the anti-theft circuit 15. If, when driving, the associated vehicle strikes a relatively stationary object with sufficient force, the impact switches A, or one thereof, will close to energize the electromagnet E which attracts the associated armature F in order to close an electrical circuit from the storage battery B to the electric motor M. As the motor M is energized, the pump P is driven thereby to force fluid under pressure through the fluid conduit 9, where fluid under pressure forces the slidable shaft 20 of the valve V in its foremost position, thus closing the normal pedal-controlled hydraulic brake system stemming from the cylinder C, and allowing fluid from the pump to pass directly to the individual brake drums of the automobile. Once fluid has passed through the valve with the shaft 20 in its foremost position, the pressure will be locked by means of a restricted valve 57 positioned within the bore 27 of the shaft in a manner to permit free flow of fluid from the pump and preclude backward flow of fluid from the drums through the valve. Thus the associated vehicle is brought to a stop and locked in this position until the valve V is released by the manually controlled spring lock 32. Upon release of this lock, the pressure upon the brake lines is relieved, allowing excess fluid to return and overflow through the master cylinder C.

As the pump P forces fluid through the conduit 9, the circuit-breaker switch X will also function to break the normal ignition circuit of the vehicle and consequently stop the engine thereof. Also, the switch X serves to close an associated signal circuit 12 which incorporates both visual and oral means as a notification of an accident or collision. It will here be understood that both the valve V and the circuit-breaker switch X must be manually reset before normal vehicle operation can be resumed. As the ignition circuit of the vehicle is broken, the current to the electric motor M will be stopped in order to relieve the pressure emanating from the pump P. However, the electromagnet E will remain energized as long as one of the impact switches A is in its closed position, and the storage battery B contains sufficient electrical charge.

Referring to circuit 15, heretofore referred to as an antitheft circuit, it will be seen that the manually controlled switch T functions independently of the impact switches A, and in conjunction with the ignition switch I to energize the electromagnet E and set in motion the remainder of the safety device system.

In addition to these circuits, the electrical starter S of the automobile derives its power from the ignition circuit and will thus be rendered inoperative upon the opening of the circuit-breaker switch X.

To prevent theft of the associated vehicle, the operator thereof when leaving the vehicle may, with the ignition switch I in the "off" position, close the switch T; thus any other person ignorant of the presence of the switch T, when attempting to start the vehicle by operating the ignition switch I, will automatically set the safety system into motion to lock the brakes, break the ignition circuit, and close the visual and oral signal circuit.

In view of the foregoing, it will be noted that the present safety device system incorporates relatively few and simple component parts which go to make up a device capable of rendering and maintaining a vehicle inoperative upon collision with another vehicle, a pedestrian or any relatively stationary object. In addition to the safety collision feature, the device incorporates anti-theft means of a positive and mechanically efficient nature. The device may be easily installed upon the normal present day motor vehicle with a minimum of structural modification thereto, and at a nominal cost to the individual owner.

While I have disclosed what I now deem to be a preferred embodiment of my invention, it will be manifest that various modifications are possible without departing from the spirit of the invention or the scope of the following claims.

I claim:

1. A safety device for motor vehicles having fluid-actuated wheel brakes and an electrical ignition circuit, said device comprising a storage battery, an electric motor, a fluid-displacement pump driven by said motor, a reservoir for supplying fluid to said pump, means for conducting fluid under pressure of said pump to said wheel brakes, means responsive to the pressure of fluid from said pump for opening said ignition circuit, an electromagnetic relay switch for supplying electrical current from said battery to said motor, and switch means responsive to forces created upon impact of said vehicle with another object for controlling said relay switch.

2. A safety device for motor vehicles having fluid-actuated wheel brakes and an electrical ignition circuit, said device comprising a storage battery, an electric motor, a fluid-displacement pump driven by said motor, a reservoir for supplying fluid to said pump, means for conducting fluid under pressure of said pump to said wheel brakes, means responsive to the pressure of fluid from said pump for opening said ignition circuit, an electromagnetic relay switch for supplying electrical current from said battery to said motor, switch means responsive to forces created upon impact of said vehicle with another object for controlling said relay switch, and an anti-theft circuit including a manually operable switch cooperative with said ignition circuit for controlling said relay switch independently of said switch means.

3. A safety device for motor vehicles having fluid-actuated wheel brakes and an electrical ignition circuit, said device comprising a storage battery, an electric motor, a fluid-displacement pump driven by said motor, a reservoir for supplying fluid to said pump, means for conducting fluid under pressure of said pump to said wheel brakes, means responsive to the pressure of fluid from said pump for opening said ignition circuit, an electromagnetic relay switch for supplying electrical current from said battery to said motor, switch means responsive to forces created upon impact of said vehicle with another object for controlling said relay switch, an anti-theft circuit including a manually operable switch cooperative with said ignition circuit for controlling said relay switch independently of said switch means, and signal means operable in response to fluid pressure created by said pump upon the opening of said ignition circuit.

4. A safety device for motor vehicles of the type provided with an electrical ignition circuit, fluid-actuated wheel brakes, and means for conducting fluid under pressure to the brakes, said device comprising an electric motor, a fluid-displacement pump driven by said motor, valve means interposed within the fluid-conducting means of the vehicle and communicating with said pump for introducing fluid under pressure to the wheel brakes of the vehicle in response to the operation of said pump, a fluid-actuated switch interposed within the ignition circuit of the vehicle and connected with said pump, said fluid-actuated switch being operable in response to the pressure of fluid from said pump to open the ignition circuit of the vehicle, an electrical relay switch for controlling the operation of said electric motor, and switch means electrically connected with said relay switch and responsive to forces created upon impact of the vehicle with another object for controlling the operation of said relay switch.

5. A safety device for motor vehicles of the type provided with an electrical ignition circuit, fluid-actuated wheel brakes, and means for conducting fluid under pressure to the brakes, said device comprising a fluid-displacement pump, an electric motor operable to drive said pump, valve means connected with said pump and interposed within the fluid-conducting means of the vehicle, said valve means being operable in response to the pressure of fluid from said pump to introduce fluid under pressure to the wheel brakes of the vehicle, a fluid-actuated switch interposed within the ignition circuit of the vehicle and operable in response to the pressure of fluid from said pump to open the ignition circuit of the vehicle, a relay switch electrically connected with said motor for controlling the operation thereof, and switch means electrically connected with said relay switch for controlling the latter, said switch means being operable in response to forces created upon impact of the vehicle with another object to close said relay and energize said motor.

6. An automatic brake-applying and ignition circuit-breaker safety device for motor vehicles of the type having an ignition circuit, fluid-actuated wheel brakes, and fluid-conducting means for conducting fluid under pressure to the wheel brakes, said device comprising a hydraulic fluid pump, an electric motor operable upon energization to drive said pump, valve means connecting said pump with the fluid-conducting means of the vehicle and operable in response to fluid pressure from said pump to introduce fluid under pressure of said pump to the wheel brakes of the vehicle, a fluid-actuated circuit breaker interposed within the ignition circuit of the vehicle and connected with said pump for opening the ignition circuit of the vehicle in response to fluid pressure created by said pump, an electromagnetic relay switch electrically connected with said motor and operable to control the energization thereof, and switch means operable in response to forces created upon impact of the vehicle with another object to control the operation of said relay switch.

CHARLES G. MAHRING.

REFERENCES CITED

The following references are of record in the file of this patent:

UNITED STATES PATENTS

| Number | Name | Date |
| --- | --- | --- |
| 1,925,763 | Kirschen | Sept. 5, 1933 |
| 2,185,936 | Yamada | Jan. 2, 1940 |
| 2,296,003 | Van Loo | Sept. 15, 1942 |

FOREIGN PATENTS

| Number | Country | Date |
| --- | --- | --- |
| 554,067 | Germany | July 1, 1932 |